(12) United States Patent
Kisaichi et al.

(10) Patent No.: US 8,443,770 B2
(45) Date of Patent: May 21, 2013

(54) SECONDARY AIR SUPPLY SYSTEM OF INTERNAL COMBUSTION ENGINE

(75) Inventors: Toru Kisaichi, Saitama (JP); Shinya Wakabayashi, Saitama (JP); Shinsuke Kawakubo, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 1477 days.

(21) Appl. No.: 12/042,061

(22) Filed: Mar. 4, 2008

(65) Prior Publication Data
US 2008/0308082 A1 Dec. 18, 2008

(30) Foreign Application Priority Data
Mar. 7, 2007 (JP) ................................. 2007-057350

(51) Int. Cl.
*F01L 1/00* (2006.01)
(52) U.S. Cl.
USPC ................... 123/90.1; 123/90.23; 123/90.27; 123/41.82 A; 123/585
(58) Field of Classification Search
USPC ................... 123/90.1, 90.23, 90.27, 41.82 R, 123/41.82 A, 41.92 R, 315, 432, 308, 585, 123/586
See application file for complete search history.

(56) References Cited

U.S. PATENT DOCUMENTS

| | | | |
|---|---|---|---|
| 3,359,722 A | 12/1967 | Sebestyen | |
| 3,949,715 A | 4/1976 | Faix et al. | |
| 4,437,305 A | 3/1984 | Ikenoya et al. | |
| 4,527,518 A * | 7/1985 | Osaki et al. | 123/90.23 |
| 5,070,824 A * | 12/1991 | Morishita | 123/41.82 R |
| 6,234,124 B1 | 5/2001 | Tsukui et al. | |
| 2008/0184956 A1 | 8/2008 | Inui et al. | |

FOREIGN PATENT DOCUMENTS

| | | |
|---|---|---|
| JP | 59-145320 A | 8/1984 |
| JP | 2001-50044 A | 2/2001 |
| JP | 2004-36479 A | 2/2004 |

* cited by examiner

*Primary Examiner* — Noah Kamen
*Assistant Examiner* — Long T Tran
(74) *Attorney, Agent, or Firm* — Birch, Stewart, Kolasch & Birch, LLP

(57) ABSTRACT

A secondary air supplying system of an internal combustion engine includes secondary air valve chambers to control the supply of secondary air. The secondary air valve chambers are formed in a cylinder-head cover that covers a cylinder head from above. In such a secondary air supplying system, a cam shaft and a rocker-arm shaft are offset from a cylinder axis L and are disposed at respective sides of the cylinder axis L from each other. In addition, the secondary air valve chambers are formed at the rocker-arm-shaft side of the cylinder axis L. With this configuration, it is possible for the secondary air valve chambers formed in the cylinder-head cover to be disposed as close as possible to a cylinder head, and the internal combustion engine can be made more compact in size.

20 Claims, 8 Drawing Sheets

SECONDARY AIR SUPPLY SYSTEM OF INTERNAL COMBUSTION ENGINE

CROSS-REFERENCE TO RELATED APPLICATION

The present application claims priority under 35 U.S.C. §119 to Japanese Patent Application No. 2007-057350, filed Mar. 7, 2007, the entire contents of which are hereby incorporated by reference.

BACKGROUND OF THE INVENTION

1. Field of the Invention

The present invention relates to a secondary air supply system of an internal combustion engine.

2. Description of Background Art

In a type of internal combustion engines that have been proposed thus far, a valve-lifting system is equipped with a cam shaft and a rocker-arm shaft that pivotally supports a rocker arm disposed in parallel with each other in the cylinder head. In addition, the type of engine has a secondary air valve chamber that is formed in the cylinder head cover to control the supply of secondary air (see, for example, Patent Japanese Patent Application Laid-Open Publication No. 2001-50044).

The engine disclosed in Japanese Patent Application Laid-Open Publication No. 2001-50044 is a four-stroke engine equipped with an SOHC-type valve-lifting system. The cam shaft of the engine is rotatably supported at the interface between cylinder head and the cylinder-head cover, and is positioned on the cylinder axis (on the central axis line of the cylinder bore). In addition, an intake valve and an exhaust valve are disposed respectively at the two sides of the cam shaft.

The intake-side rocker-arm shaft and the exhaust-side rocker-arm shaft are supported in parallel with each other respectively at positions located obliquely above the cam shaft. The two rocker-arm shafts are disposed respectively at the two sides of the cam shaft, so as to be symmetrical with respect to a plane including the cam shaft. Each of the rocker-arm shafts pivotally supports a rocker arm. Each of the rocker arms swings and drives the corresponding one of the intake and the exhaust valves.

The secondary air valve chamber is formed in the cylinder-head cover that covers the cylinder head. The secondary air valve chamber is located on the cylinder axis between the rocker arms respectively located at the two sides of the cylinder axis.

Accordingly, while the two rocker arms are brought into contact with the cam shaft from above, the secondary air valve chamber is disposed further above the two rocker arms. The engine has to have a long dimension in the cylinder-axis direction, resulting in a difficulty in manufacturing a smaller-sized engine of this type.

SUMMARY AND OBJECTS OF THE INVENTION

The present invention is made in view of the difficulty described above. Therefore, the invention aims at providing a valve-lifting structure of an engine to help the secondary air valve chamber formed in the cylinder head cover to be disposed as close as possible to the cylinder head. In addition, the valve-lifting structure helps the engine to be made compact in size.

To achieve the above-mentioned objects, a first aspect of the present invention provides a secondary air supplying system of an internal combustion engine including: a cylinder head; a cam shaft provided in the cylinder head; a rocker-arm shaft which is provided in the cylinder head and in parallel with the cam shaft; a rocker arm pivotally supported by the rocker-arm shaft; a cylinder-head cover for covering the cylinder head from above; and a secondary air valve chamber is formed in the cylinder-head cover to control the supply of secondary air. In addition, in the secondary air supplying system, the cam shaft and the rocker-arm shaft are offset from the cylinder axis, and are disposed at respective sides of the cylinder axis from each other, and the secondary air valve chamber is formed at the rocker-arm-shaft side of the cylinder axis.

A second aspect of the invention provides a secondary air supplying system of an internal combustion engine according to the first aspect further including: an intake valve; an exhaust valve; and a first and a second cam lobes provided on the cam shaft. In addition, in the secondary air supplying system, a first one of the intake and the exhaust valves is driven directly by the first cam lobe while a second one of the intake and the exhaust valves is driven by the second cam lobe via the rocker arm.

A third aspect of the invention provides a secondary air supplying system of an internal combustion engine according to any one of the first and the second aspects further including: a combustion chamber: In addition, in the secondary air supplying system, the rocker-arm shaft is disposed closer to the combustion chamber than the cam shaft is.

A fourth aspect of the invention provides a secondary air supplying system of an internal combustion engine according to any one of the first to the third aspects further including: a plurality of cylinders arranged in an axial direction of the cam shaft. In addition, the secondary air valve chamber is formed between two adjacent ones of the cylinders.

A fifth aspect of the invention provides a secondary air supplying system of an internal combustion engine according to the third aspect further including: a rocker-arm-shaft bearing member formed as a body separated from the cylinder head. In addition, in the secondary air supplying system, the rocker-arm shaft is rotatably supported by the rocker-arm-shaft bearing member.

A sixth aspect of the invention provides a secondary air supplying system of an internal combustion engine according to the first aspect, in which system the secondary air valve chamber is formed at an opposite side of the rocker-arm shaft from the cam shaft.

A seventh aspect of the invention provides a secondary air supplying system of an internal combustion engine according to the first aspect further including: a plurality of cylinders arranged in an axial direction of the cam shaft. In addition, in the air supplying system, the secondary air valve chamber is formed at the outer side of the outer most one of the cylinders.

An eighth aspect of the invention provides a secondary air supplying system of an internal combustion engine according to the first aspect further including a secondary air passage. In addition, in the secondary air supplying system, the rocker arm is bent from a pivotally-supporting portion of the rocker-arm shaft to any one of axial directions, and the secondary air passage is formed as shifted to the same direction that the rocker arm is bent to.

Effects of the invention include the following:

In the secondary air supplying system of an internal combustion engine according to the first aspect, the cam shaft and the rocker-arm shaft are offset from the cylinder axis, and are disposed at respective sides of the cylinder axis from each other. Accordingly, the rocker-arm shaft can be disposed at a position closer to the combustion chamber than the cam shaft is. In addition, the secondary air valve chamber formed at the rocker-arm-shaft side of the cylinder axis can also be disposed at a position as close as to the cylinder bead. As a result, the length of the engine along the cylinder axis can be made smaller, and thus the engine itself is made more compact in size.

The secondary air supplying system of an internal combustion engine according to the second aspect includes a valve-lifting structure in which a first one of the intake and the exhaust valves is driven directly by the first cam lobe while a second one of the intake and the exhaust valves is driven by the second cam lobe via the rocker arm. Accordingly, the rocker arm is disposed not at the two sides of the cam shaft but at only a single side of the cam shaft. The intake valve and the exhaust valve can be placed close to each other. As a result, both the cylinder head and the cylinder-head cover can be made smaller, and thus the internal combustion engine itself can be made more compact in size.

In the valve-lifting system of the secondary air supplying system of an internal combustion engine according to the third aspect, the rocker-arm shaft is disposed closer to the combustion chamber than the cam shaft is. Accordingly, the secondary air valve chamber formed on the rocker-arm shaft side can be disposed closer to cylinder head. As a result, the length of the engine along the cylinder axis can be made smaller, and thus the engine itself is made more compact in size.

In the secondary air supplying system of an internal combustion engine according to the fourth aspect, the secondary air valve chamber is formed between two adjacent ones of the plurality of cylinders disposed in an axial direction of the cam shaft. Accordingly, the secondary air valve chamber can be formed as close as possible to the cylinder head while the interference that might possibly occur between the secondary air valve chamber and the rocker arm can be avoided. The cylinder-head cover is thus made more compact in size.

In the secondary air supplying system of an internal combustion engine according to the fifth aspect, the rocker-arm shaft is rotatably supported by the rocker-arm-shaft bearing member formed as a body separated from the cylinder head. Accordingly, for the purpose of making the engine more compact in size, the rocker-arm shaft can be disposed, with ease, at a position closer to the combustion chamber than the cam shaft is.

To put it other way, the forming of the rocker-arm-shaft bearing member as a separate body contributes to making the engine more compact in size. Meanwhile, reduction in man hour for the processing of the cylinder head is accomplished, and thus an improvement in the assembling easiness is also accomplished.

In the secondary air supplying system of an internal combustion engine according to the sixth aspect, the secondary air valve chamber is formed at an opposite side of the rocker-arm shaft from the cam shaft. Accordingly, the secondary air valve chamber can be formed as close as possible to the cylinder head while the interference that may possibly occur between the secondary air valve chamber and the rocker arm can be avoided. The cylinder-head cover is thus made more compact in size.

In the secondary air supplying system of an internal combustion engine according to the seventh aspect, the secondary air valve chamber is formed at the outer side of the outer most one of the plurality of cylinders arranged in an axial direction of the cam shaft. Accordingly, a larger space to be occupied by structural members for the vehicle body is secured in the central portion in the arrangement direction of the cylinders.

In the secondary air supplying system of an internal combustion engine according to the eighth aspect, the rocker arm is bent from the pivotally-supporting portion of the rocker-arm shaft to any one of axial directions, and the secondary air passage is formed as shifted to the same direction that the rocker arm is bent to. Accordingly, the secondary air passage can be formed at a position closer to a valve located in the same direction that the bent rocker arm extends to. As a result, the length of the passage can be shortened.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
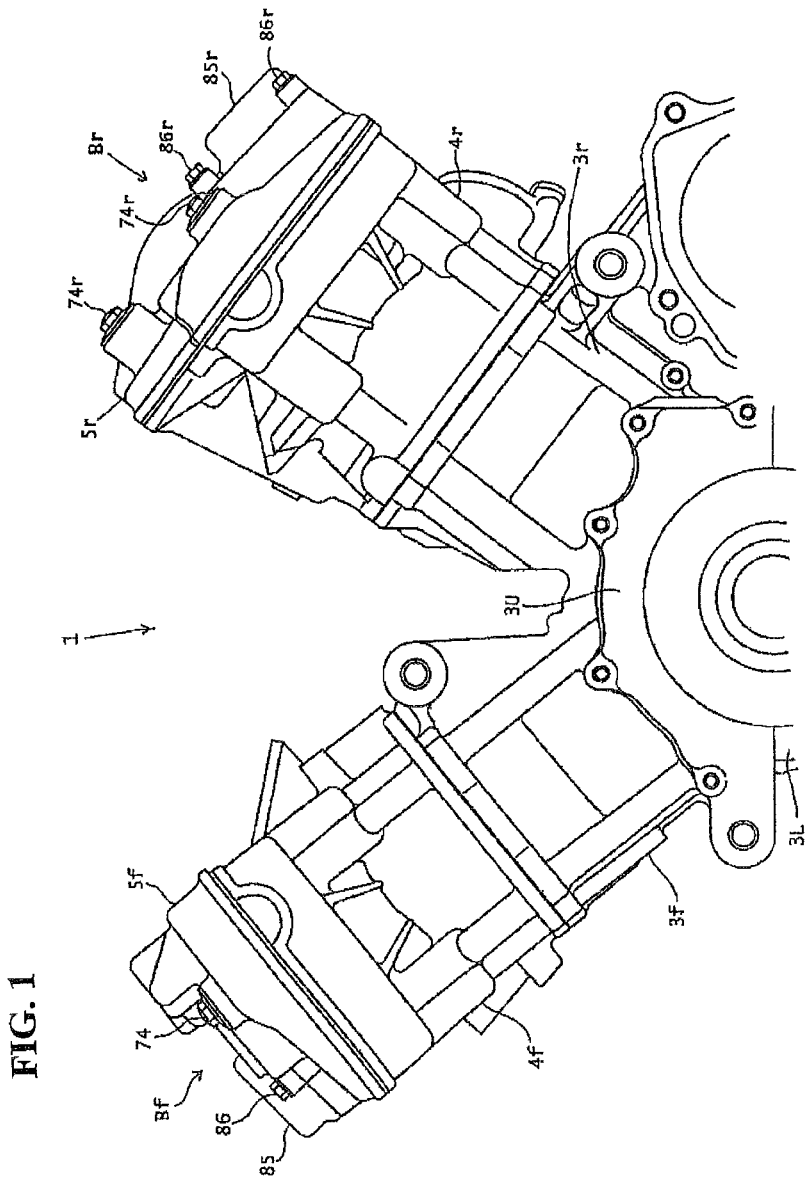
FIG. 1 is a partial side-elevation view of a V-type four-cylinder internal combustion engine according to an embodiment of the present invention.

As can be seen in FIGS. 1-4, an embodiment of the present invention includes an internal combustion engine 1 with four cylinders arranged in a V-shape and inclined either to the front or to the rear. The engine 1 is mounted on a motorcycle.

The engine 1 is a transverse-type engine, that is, the engine 1 is mounted on the motorcycle with a crankshaft 2 arranged horizontally and oriented in the right-and-left direction of the vehicle. In addition, the engine 1 is a water-cooling, OHC-type engine. Two front banks Bf for two cylinders and two rear banks Br for another two cylinders are arranged in a V-shape with a bank angle in-between of a little smaller than 90°.

The crankshaft 2 is rotatably supported by crankcases 3U and 3L, which are separable one above the other. A front-side cylinder block 3*f* and a rear-side cylinder block 3*r* are formed so as to extend obliquely upward from the upper crankcase 3U. The blocks 3*f* and 3*r* thus form a V-shape when viewed from a side, while each of the blocks 3*f* and 3*r* has two cylinders arranged, one on the left-hand side, and the other on the right-hand side.

On the front-side cylinder block 3*f*, a front-side cylinder head 4*f* is laid obliquely frontwards, and the front-side cylinder block 3*f* and the front-side cylinder head 4*f* are fastened together with a fastening bolt 48. In addition, a front-side cylinder-head cover 5f covers the front-side cylinder head 4f from above.

Likewise, on the rear-side cylinder block 3r, a rear-side cylinder head 4r is laid obliquely rearwards, and the rear-side cylinder block 3r and the rear-side cylinder head 4r are fastened together with a fastening bolt 48. In addition, a rear-side cylinder-head cover 5r covers the rear-side cylinder head 4r from above.

Each of the front-side and the rear-side cylinder blocks 3f and 3r has a cylinder bore 3b. Pistons 6f and 6r reciprocate respectively inside the cylinder bores 3b. Both of the pistons 6f and 6r are connected in common to the crankshaft 2 respectively with connecting rods 7f and 7r.

Here, the distance between the right and the left cylinders of the front bank Bf is longer than that of the rear bank Br, so that the width of the front bank Bf is wider than that of the rear bank Br in the width direction of the body.

Valve-lifting systems are provided in the corresponding one of the front-side cylinder head 4f and the rear-side cylinder head 4r, each of which is laid on the corresponding one of the front-side cylinder block 3f and the rear-side cylinder block 3r. The valve-lifting system of the front side and that of the rear side are substantially identical in their structure, and symmetrically arranged in the front-to-rear direction.

Therefore, the structure for a valve-lifting system 20 of the front bank Bf will be described in detail firstly, and then only a simpler description will be given later for the valve-lifting system of the rear bank Br. The description for the valve-lifting system of the rear bank Br is mainly focused on the differences between the valve-lifting systems of the banks Bf and Br.

A combustion chamber 10 is formed between the top surface of the piston 6f that slidingly travels inside each cylinder bore 3b formed in the front-side cylinder block 3f and the ceiling surface of the front-side cylinder head 4f that faces the top surface of the piston 6f. A right and left pair of intake ports 11, 11 extend rearwards with a right and left pair of intake openings formed in the rear-side half of the ceiling surface of the combustion chamber 10. The pair of intake ports 11, 11 are joined together and then connected to a throttle body.

In addition, a right and left pair of exhaust ports 12, 12 extend forwards with a right and left pair of exhaust openings formed in the front-side half of the ceiling surface of the combustion chamber 10. The pair of exhaust ports 12, 12 are joined together and then connected to an exhaust pipe.

The openings of the intake port 11 formed in the combustion chamber 10 is opened and closed by an intake valve 21, which is slidably guided by a valve guide 22. A valve lifter 23 covers the upper end of the valve stem of the intake valve 21, and the valve lifter 23 is slidably guided by a lifter guide 24.

A valve spring 27 is provided to bias the intake valve 21 upwards. The valve spring 27 is installed between an upper retainer 25 that is fitted on the upper end of the valve stem and a spring seat 26 that abuts against the top surface of the middle floor of the front-side cylinder head 4f. The intake valve 21 is closed when biased in that direction.

On the other hand, The openings of the exhaust port 12 formed in the combustion chamber 10 is opened and closed by an exhaust valve 31, which is slidably guided by a valve guide 32. A valve spring 37 is provided to bias the exhaust valve 31 upwards. The valve spring 37 is installed between an upper retainer 35 that is fitted on the upper end of the valve stem and a spring seat 36 that abuts against the top surface of the middle floor of the front-side cylinder head 4f. The exhaust valve 21 is closed when biased in that direction.

To efficiently take the air into the combustion chamber 10, each of the openings for intake has a larger opening area than that of each of the openings for exhaust. Accordingly, the intake valve 21 has a larger diameter than that of the exhaust valve 31. As a consequence, the valve spring 27 for the intake valve 21 has a larger spring load than that of the valve spring 37 for the exhaust valve 31.

The intake valve 21 and the exhaust valve 31 are driven by the valve-lifting system 20 provided with the engine 1. Each of these valves 21 and 31 opens and closes, in synchronization with the rotation of the crankshaft 2, the corresponding one of the intake port 11 and the exhaust port 12, each of which has an opening in the combustion chamber 10.

Figure 2:
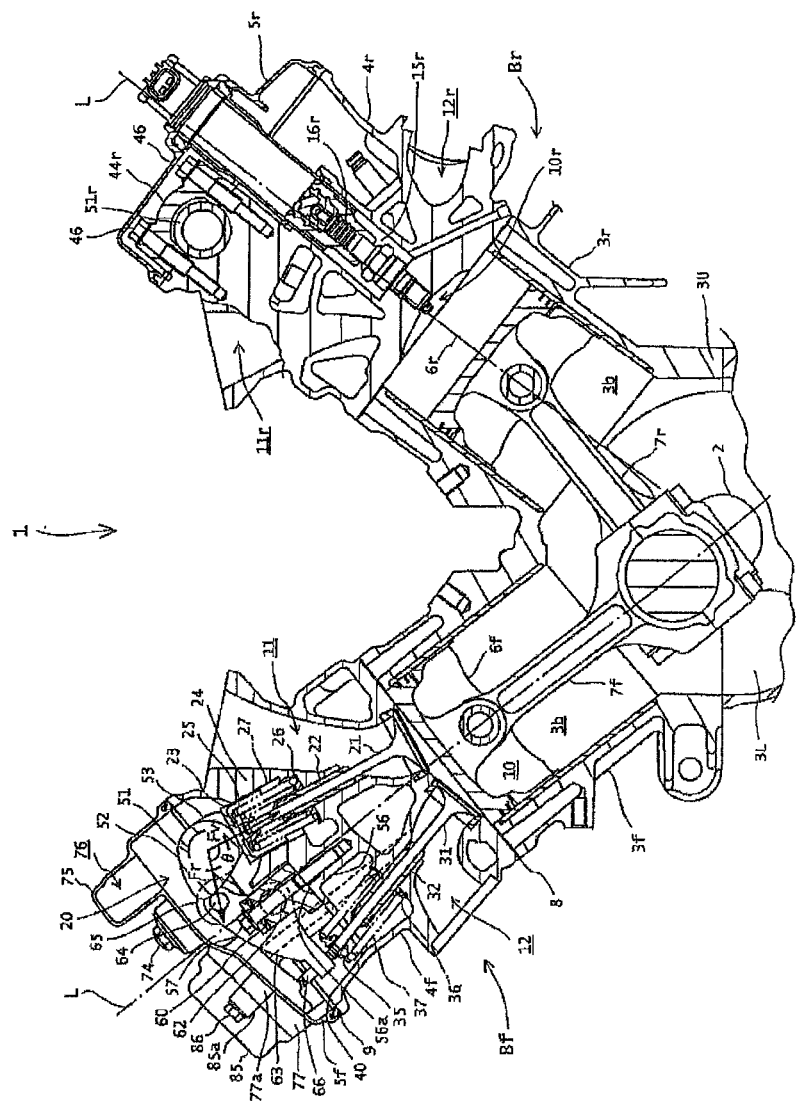
FIG. 2 is a side sectional view of the engine.
Figure 5:
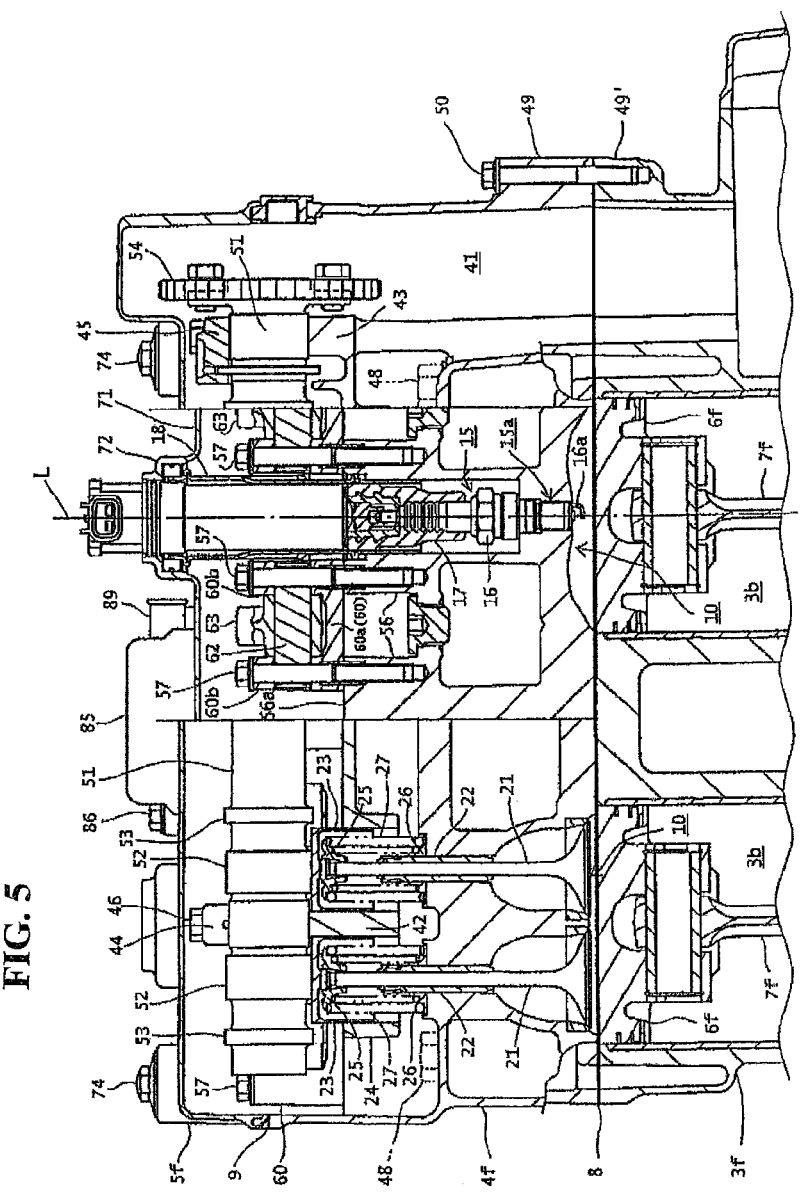
FIG. 5 is a sectional view taken along the line V-V in FIG. 3.

Now, refer to FIG. 5 (and also to FIG. 2). In the front-side cylinder head 4f, a plug insertion hole 15 is formed on a line representing the axis of the cylinder bore 3b—cylinder axis L. Note that the axis of the plug insertion hole 15 is slightly shifted from the cylinder axis L so that the two axes are not coincided with each other. At the bottom end of the plug insertion hole 15, a smaller-diameter hole—electrode hole 15a—is formed to have an opening at the center of the ceiling surface of the combustion chamber 10. An ignition plug 16 connected to a stick coil 17 is inserted into the plug insertion hole 15 and an electrode portion 16a formed at the leading end of the spark plug 16 is fitted into the electrode hole 15a. The leading end of the electrode portion 16a is exposed to the combustion chamber 10. FIG. 2 also illustrates spark plug 16r inserted into plug insertion hole 15r of the rear cylinder bank Br.

A plug tube 18 extends upwards with its lower portion being fitted in the plug insertion hole 15 of the front-side cylinder head 4f. The opening portion at the upper end portion of the plug tube 18 is fitted into the cylindrical portion 72 formed in an upper wall 71 of the front-side cylinder head cover 5f. A sealing member 19 is set between the plug tube 18 and the cylindrical portion 72.

Figure 3:
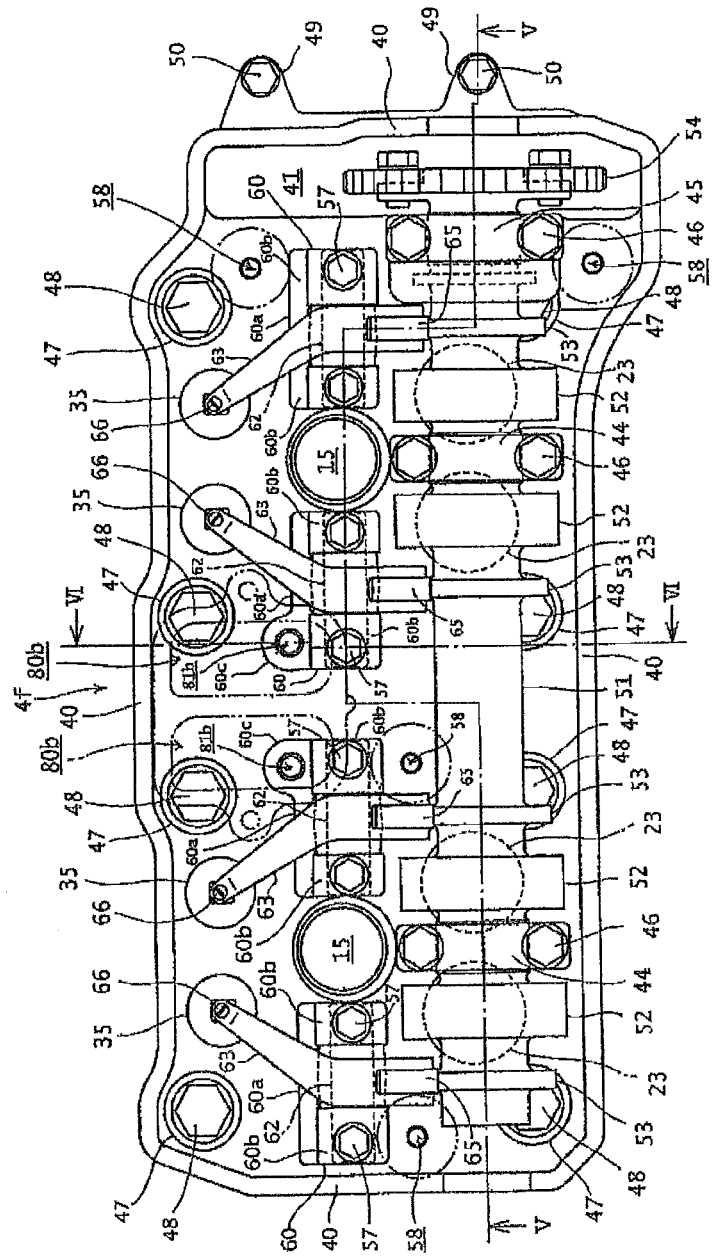
FIG. 3 is a top view of a front-side cylinder head in a state where a front-side cylinder-head cover is detached off.

Now, refer to FIG. 3, which is a top-side view illustrating the internal structure of the front-side cylinder head 4f when viewed with the front-side cylinder-head cover 5f being detached. The upper end surface of the circumferential wall of the front-side cylinder head 4f has a rectangular shape with longitudinal sides being oriented in the right-and-left direction. The upper end surface is a joint surface 40 with which the front-side cylinder head 4f is joined to the front-side cylinder-head cover 5f. Inside the joint surface 40, the plug insertion holes 15, 15 are formed respectively at the central positions of the right and left cylinders. At the rear side of each plug insertion hole, the valve lifters 23 of the intake valves 21 are projected from positions located at the right and the left sides of the plug insertion hole 15. Meanwhile, at the front side of each plug insertion hole 15, the valve stems of the exhaust valves 31, each of which supports the corresponding one of the upper retainers 35, are projected from positions located at the right and left sides of the plug insertion hole 15. A chain chamber 41 is formed at the right-hand end of the front-side cylinder head 4f. The chain chamber has a rectangular shape with its longitudinal sides being oriented in the front-to-rear direction.

A bearing wall 42 is formed between the right and left pair of the valve lifters 23, 23 respectively for the projected intake valves 21, 21. Another bearing wall 43 is formed at a position further at the right-hand side of the right-hand one of the above mentioned bearing walls 42 along the side edge of the chain chamber 41 (see FIG. 5).

On the top surface of each of the three bearing walls 42, 42, and 43, a cam-shaft rotatably-supporting portion is formed in a semi-circular shape. The upper end surfaces at the front and the rear of each cam-shaft rotatably-supporting portion is on the same plane that the joint surface 40 of the circumferential wall is on.

Cam-shaft holders 44, 44, and 45 are laid on and fixed to the top surface of each of the three bearing walls 42, 42, and 43 with bolts 46. Each of the cam-shaft holders 44, 44, and 45 has a semi-circular shaped cam-shaft rotatably-supporting portion. A cam shaft 51 is rotatably supported by being held by and between the cam-shaft rotatably-supporting portions while oriented in the right-and-left direction.

Intake cam lobes 52, 52 are projected from the cam shaft 51 at positions adjacent to each cam-shaft holder 44 respectively at the right and the left sides thereof. Two exhaust cam lobes 53, 53 are projected at the outer sides of the two intake cam lobes 52, 52—one on the right side of the right-hand intake cam lobe 52 and the other on the left side of the left-hand intake cam lobe 52.

Note that each exhaust cam lobe 53 is narrower in width than the a width of each intake cam lobe 52.

Accordingly, at the left outer side of the left-hand camshaft holder 44, which is the bearing disposed at the outermost side, a set of one of the intake cam lobes 52 and one of the exhaust cam lobes 53 is supported in a cantilevered state.

For this reason, no bearing is provided on the left-hand end portion of the cam shaft 51. There is no need to raise outwards a portion of the circumferential wall of the front-side cylinder head 4f, which would be necessary when such a bearing was disposed. As a result, the engine 1 is made more compact.

Meanwhile, the right-hand end portion of the cam shaft 51 is rotatably supported by the right-hand cam-shaft holder 45, and sticks out inside the chain chamber 41. A driven sprocket 54 is attached on the sticking-out portion of the cam shaft 51.

A cam chain is trained around the driven sprocket 54 and a drive sprocket (not illustrated) that is fitted onto the crankshaft 2. Accordingly, the cam shaft 51 rotates along with the rotation of the crankshaft 2 at a speed that is half of the rotation speed of the crankshaft 2.

The intake cam lobes 52, 52 are formed at positions adjacent to and at the right and left sides of each cam-shaft holder 44 on the cam shaft 51. The intake cam lobes 52, 52 are positioned respectively above the right and left pair of the valve lifters 23, 23 of the intake valves 21 and 21. The intake cam lobes 52, 52 are in contact respectively with the top surfaces of the valve lifters 23, 23. The rotation of the intake cam lobes 52, 52 on the cam shaft 51 directly drives the respective intake valves 21, 21.

Rocker-arm-shaft bearing members 60, 60, which are bodies formed separately from the front-side cylinder head 4f, are attached to positions at the right and left sides of each plug insertion hole 15 formed in the cylinder head 4f.

Inside the front-side cylinder head 4f, the rocker-arm-shaft bearing members 60, 60 are attached to an attachment boss portion 56. The surface onto which the rocker-arm-shaft bearing members 60, 60 are attached (attachment-seat surface 56a) is located at a lower position that is closer to the combustion chamber 10 than the joint surface 40 of the front-side cylinder-head cover 5f is (see FIG. 2).

Each rocker-arm-shaft bearing member 60 includes a rectangular base portion 60a that is to be in contact with the attachment-seat surface 56a of the attachment boss portion 56. Also included are bearing walls 60b, 60b. The bearing walls 60b, 60b are opposed to each other, and stand up respectively from the right and left portions of the rectangular base portion 60a. The top-end surface of each of the bearing walls 60b, 60b is on the same plane that the joint surface 40 is on.

Bearing holes are coaxially formed respectively in the bearing walls 60b, 60b. A rocker-arm shaft 62 is provided with its two ends being fitted into the respective bearing holes.

Each of the bearing walls 60b, 60b of each rocker-arm-shaft bearing member 60 has a bolt hole that is drilled from the top-end surface to the bottom-end surface so as to be orthogonal to the bearing hole. The rocker-arm-shaft bearing member 60 that is mounted on the attachment-seat surface 56a of the attachment boss portion 56 is attached to the attachment boss portion 56 with a bolt 57. The bolt 57 is inserted into the bolt hole from the top-end surface of each of the bearing walls 60b, 60b, penetrates the rocker-aim shaft 62, and is screwed into the attachment boss portion 56.

Figure 6:
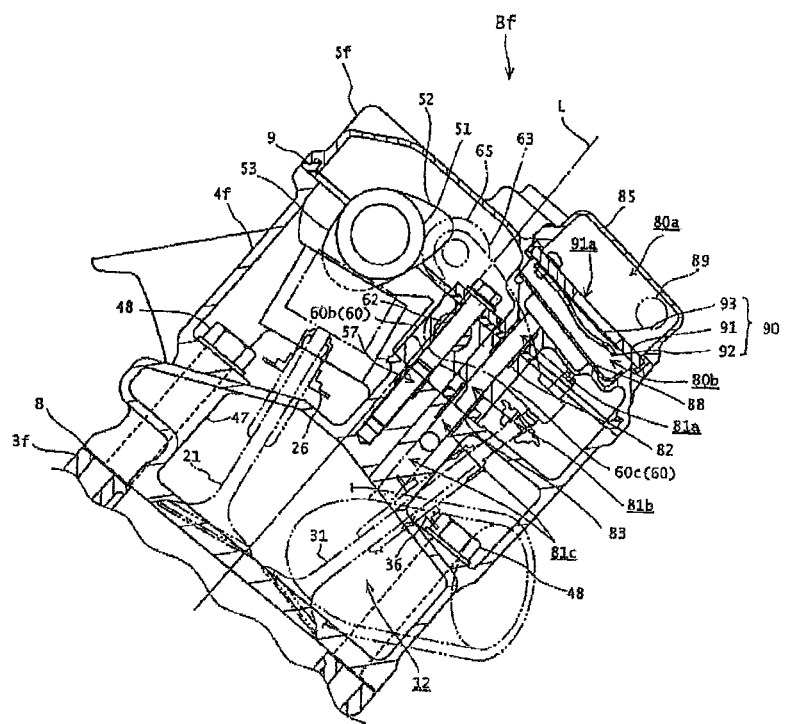
FIG. 6 is a sectional view taken along the line VI-VI in FIG. 3.

As FIGS. 2 and 6 show, the central axis of the rocker-arm shaft 62 is positioned so as to pass near the cylinder axis L.

The rocker-arm shaft 62 is offset from the cylinder axis L to the opposite side of the cylinder axis L from the cam shaft 51 when viewed from a side (see FIG. 2).

A rocker arm 63 is pivotally supported so as to swing freely on the rocker-arm shaft 62, which is provided between the bearing walls 60b, 60b of the rocker-arm-shaft bearing member 60.

The rocker arm 63 extends both forwards and rearwards from the rotatably-supporting portion of the rocker-arm shaft 62. The section that extends straightly rearwards has an end portion branching into two—a right-hand branch portion and a left-hand branch portion. Between the right-hand and the left-hand branch portions, a spindle shaft 64 is provided, and a roller 65 is rotatably supported by the spindle shaft 64. The roller 65 is brought into contact with the exhaust cam lobe 53 on the cam shaft 45 obliquely from above.

Meanwhile, the other end portion of the rocker-arm 63 extends obliquely forwards from the rotatably-supporting portion of the rocker-arm shaft 63. An adjustment screw 66 is screwed through the end portion, and the bottom end of the adjustment screw 66 is in contact with the top end of the valve stem of the exhaust valve 31.

As FIG. 3 shows, the rocker aim 63 at the left-hand side of the plug insertion hole 15 is bent from the rotatably-supporting portion, and extends obliquely rightwards. Meanwhile, the rocker arm 63 at the right-hand side of the plug insertion hole 15 is bent from the rotatably-supporting portion, and extends obliquely leftwards. The rocker arms 63, 63 then reach respective positions above the valve stems of the left-hand and the right-hand exhaust valves 31, 31.

Accordingly, the rotation of the exhaust cam lobes 46, 46 on the cam shaft 51 respectively swing the right-hand and the left-hand rocker arms 63, 63 while the swing of the right-hand and the left-hand rocker arms 63, 63 respectively drives the right-hand and the left-hand exhaust valves 31, 31.

The rocker-am shaft 62, with its central axis passing near the cylinder axis L, is located closer to the cam shaft 51 than to the exhaust valve 31. Accordingly, in the rocker arm 63, the lever on the exhaust-valve 31 side, that is, the lever extending forwards from the rocker-arm shaft 62, is longer than the lever on the intake-valve 21 side, that is, the lever extending rearwards from the rocker-arm shaft 62. With such a lever ratio, the exhaust valve 31, which has a smaller spring load than the intake valve 21, is driven by the exhaust cam lobe 53 while the torque of the exhaust cam love 53 is reduced appropriately by the rocker arm 63.

Now, refer to FIG. 2. The cam shaft 51 presses the intake valve 21 by way of the intake cam lobe 52 directly with a valve-pressing force Fv while the cam shaft 51 presses the rocker aim 63 by way of the exhaust cam lobe 53 with a rocker-arm-pressing force Fr. The direction of the valve-pressing force Fv and the direction of the rocker-arm-pressing force Fr make an angle θ, and the angle θ is an obtuse angle.

Accordingly, the load that the intake valve 21 applies on the intake cam lobe 52 provided on the cam shaft 51, has a direction that is opposite to the direction of the valve-pressing force Fv. In addition, the load that the exhaust valve 31 applies, via the rocker arm 63a, on the exhaust cam lobe 53 provided near the intake cam lobe 52 has a direction that is opposite to the rocker-arm-pressing force Fr. The directions in which the respective loads are applied make an obtuse angle. As a consequence, when the opening-and-closing of the intake and the exhaust valves 21 and 31 overlap each other, the two loads partially cancel each other out. The load combined together is thus reduced to be made smaller.

As described thus far, the valve-lifting system 20 of this engine 1 has a structure in which the intake valve 21 is directly driven by the cam shaft 51 and in which the exhaust valve 31 is indirectly driven via the rocker arm 63. In addition, to make the engine 1 more compact in size, a set of the intake cam lobe 52 and the exhaust cam lobe 53 is supported as being cantilevered, at the left-outer side of the left-hand cam-shaft holder 44, which is the outer most one of the bearings. In spite of such a structure, the combined load of the loads applied respectively on the intake cam lobe 52 and on the exhaust cam lobe 53 becomes smaller as described above. As a result, the oscillation of the end portion of the cantilevered side of the cam shaft 51 can be reduced.

This is a reason why it is not necessary to make the cam shaft 51 to be stiffer which would require an expensive material to be used, or to male the cam shaft 51 with an expensive processing. Thus, it is possible to make the engine 1 more compact in size, and without bringing about an increase in cost, or an increase in weight.

At the cantilevered end portion of the cam shaft 51, the intake cam lobe 52 is disposed on a side closer to the bearing, that is, the cam-shaft holder 44, and the exhaust cam lobe 53 is disposed on a side farther away from the cam-shaft holder 44. Accordingly, while the spring load applied on the intake valve 21 is larger than that applied on the exhaust valve 31, the intake cam lobe 52, which directly drives the intake valve 21, is disposed at a position adjacent to the bearing (cam-shaft holder 44). As a consequence, the relatively large load applied on the intake cam love 52 from the intake valve 21 can be received by the bearing located nearby. It is thus easy to optimize the stiffness balance of the cam shaft 51, so that the cam shaft 51 is made lighter in weight and is manufactured at a lower cost than otherwise.

As described above, the central axis of the rocker-arm shaft 62 passes at a position near the cylinder axis L. As a result, the rocker-arm 63 has a lever ratio that has been described above. With such a lever ratio, the load applied on the exhaust cam lobe 53 is set so appropriately that the combined load of the load applied on the exhaust cam lobe 53 and the load applied on the intake cam lobe 52 can be made as small as possible. As a result, the oscillation of the cantilevered end portion of the cam shaft 51 is reduced even further.

As has just been described, the oscillation of the cantilevered end portion of the cam shaft 51 is reduced. In addition, bearing structure of a section of the cam shaft 51 between one of the bearings (cam-shaft holder 44) and another one of the bearings (cam-shaft holder 44) is similar to the structure that contributes to the reduction in the oscillation of the cantilevered portion, so that the oscillation of the cam shaft 51 is also reduced between the bearings.

The rocker-arm shaft 62, which swingably supports the rocker arm 63, is offset from the cylinder axis L to the opposite side of the cylinder axis L from the cam shaft 51 when viewed from a side (see FIG. 2). Accordingly, the rocker-arm-shaft bearing member 60 can be attached to a position that is lower than the cam shaft 62, so that the rocker arm 63 can be placed at a position closer to the combustion chamber than otherwise.

Among the four rocker-arm shafts 63 arranged in the right-and-left direction, the two rocker-arm shafts 63 located at inner positions respectively have sticking-out portions 60c, 60c. Each sticking-out portion 60c is formed by making the inner one of the bearing walls 60b, 60b stick out forwards. In other words, the bearing walls 60b, 60b are the ones that are opposed to each other. Secondary air passages 81b, 81b are formed as vertically penetrating the respective sticking-out portions 60c, 60c (see FIGS. 3 and 6).

The top surface of each of the sticking-out portions 60c, 60c is on the same plane that the joint surface 40 of the front-side cylinder-head cover 5f of the front-side cylinder head 4f is on.

Now, refer to FIG. 6. In each attachment boss portion 56 of the front-side cylinder head 4f, a secondary air passage 81c is formed coaxially with the secondary air passage 81b of the corresponding rocker-arm-shaft bearing member 60. A connecting pipe 83 is provided to connect the two secondary air passages 81b and 81c.

The secondary air passage 81c of the front-side cylinder head 4f extends to, and has an opening in, the exhaust port 12.

Fastening boss portions 47 are formed at the inner side of the circumferential wall of the front-side cylinder head 4f—four on the front side and another four on the rear side. In each fastening boss portion 47, a bolt hole is formed to accept the fastening bolt 48 for fixing the front-side cylinder head 4f to the front-side cylinder block 3f.

Four of the fastening boss portions 47 are located at places near and around each of the right-hand and the left-hand cylinder bores 3b, 3b of the front-side cylinder block 3f. To put it other way, the fastening boss portions 47 are formed at eight positions.

The seating surface of each fastening boss portion 47 is positioned at a lower height than the position of the joint surface 40, and at a position substantially as high as the spring seats 26, 36 that respectively support the valve springs 27,37 from below (see FIG. 6).

The fastening bolts 48 inserted into the respective bolt holes of the fastening boss portions 47 of the front-side cylinder head 4f are screwed into, and thus fastened to, the front-side cylinder block 3f. As a result, the front-side cylinder head 4f and the front-side cylinder block 3f are joined together.

A gasket 8 is set between the front-side cylinder block 3f and the front-side cylinder head 4f.

With the fastening bolts 48 fastening the front-side cylinder block 3f and the front-side cylinder head 4f at the four positions near and around each cylinder bore 3b, the gas inside the cylinder bore 3b is prevented, with certainty, from blowing out of the cylinder bore 3b.

With the fastening bolts 48 disposed in this way, four of the fastening boss portions 47 on the rear side are located below the earn shaft 51. The leftmost one of these fastening boss portions 47 is located below the outermost exhaust cam lobe 53 supported, as being in a cantilevered state, at the left-outer side of the outermost one of the bearing, that is, the left-hand cam-shaft holder 44 (see FIG. 3).

While one of the end portions of the cam shaft 51 sticks outwards from the outermost left-hand bearing wall 42 (and the cam-shaft holder 44), one of the fastening bolts 48 that fasten and fix the front-side cylinder head 4f to the front-side cylinder block 3f is located at a position laid under the sticking-out end portion of the cam shaft 51, when viewed in the same direction that the fastening bolt 48 is advanced. This structure eliminates the need for any outward projection of the side wall of the front-side cylinder head 4*f* to accommodate one of the fastening boss portions 47 to be provided as avoiding the interference between the fastening bolt 48 and the bearing. As a result, the engine 1 is made more compact in size.

In addition, two fastening boss portions 49, 49—one on the front side and another one on the rear side—are formed by projecting outwards the right-hand side wall that is a constituent of the chain chamber 41 of the front-side cylinder head 4*f*. Two fastening boss portions 49', 49' are formed in the front-side cylinder block 3*f* to correspond respectively to the two fastening boss portions 49 in the front-side cylinder head 4*f*. A fastening bolt 50 is provided to fasten each pair of fastening boss portions 49, 49' together.

Furthermore, four screw holes 58 are formed in the front-side cylinder head 4*f* to fix the front-side cylinder-head cover 5*f* thereto. In the left half of the front-side cylinder head 4*f*, two of the screw holes 58—one on the right-hand side and the other on the left-hand side—are formed at the substantially central positions in the front-to-rear direction. Meanwhile, in the right half of the front-side cylinder head 4*f*, two of the screw holes 58 are respectively formed at two positions—one in the front side and the other in the rear side—along the chain chamber 41 (see FIG. 3).

Figure 4:
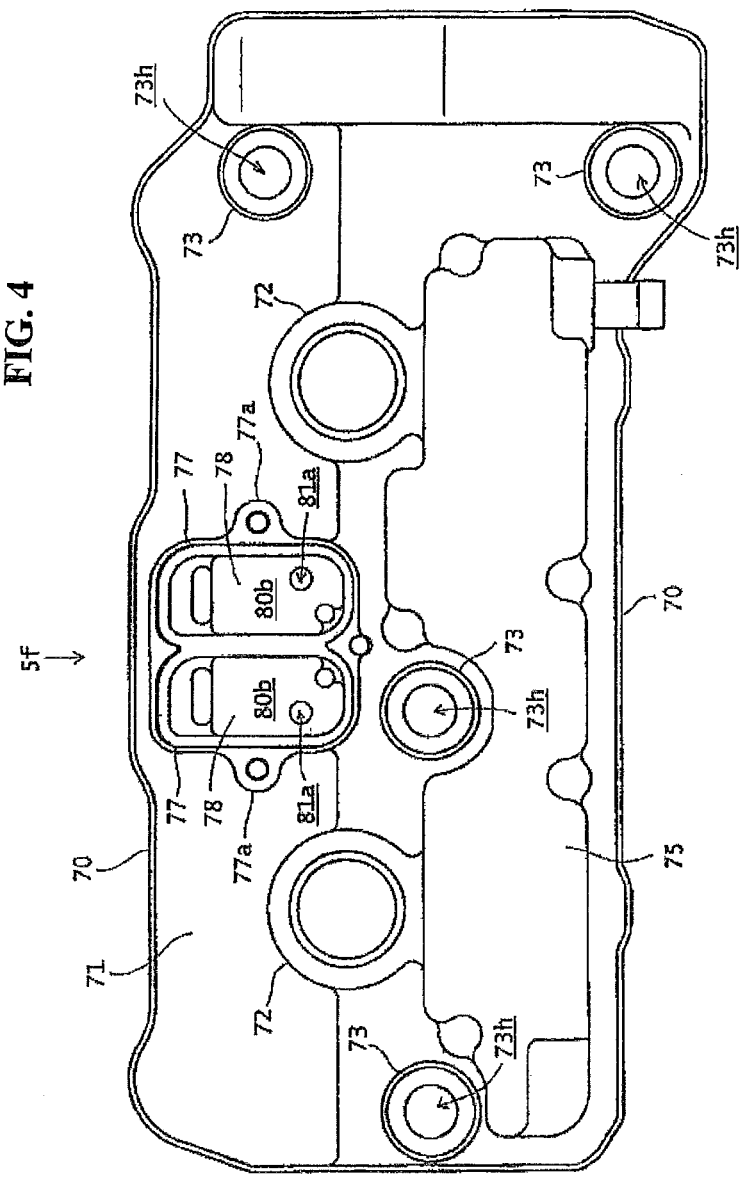
FIG. 4 is a top view of the front-side cylinder-head cover.

The front-side cylinder-head cover 5*f* covers the front-side cylinder head 4*f* from above. FIG. 4 shows that the front-side cylinder-head cover 5*f* includes a circumferential wall 70 and the upper wall 71 that covers the circumferential wall 70. The circumferential wall 70 has a joint surface that is opposed to the joint surface 40 of the front-side cylinder head 4*f*.

The upper wall 71 has a rectangular shape with longitudinal sides being oriented in the right-and-left direction. Near the center in the front-to-rear direction of the upper wall 71, the cylindrical portions 72, 72—one on the right side and the other on the left side—have their respective openings. Into each of the cylindrical portions 72, 72, the opening portion at the upper end portion of the plug tube 18 is fitted. In addition, in the upper wall 71, attachment boss portions 73, each having a bolt hole 73*h* formed therein, are formed at positions respectively corresponding to the four screw holes 58 formed in the front-side cylinder head 4*f*.

The front-side cylinder-head cover 5*f* is attached to the front-side cylinder head 4*f* in the following way. Firstly, the front-side cylinder-head cover 5*f* is laid on the front-side cylinder head 4*f*. Then, attaching bolts 74 are inserted into, and screwed into, the respective bolt holes 73*h* of the attachment boss portions 73 of the front-side cylinder-head cover 5*f*.

Here, a gasket 9 is set between the front-side cylinder head 4*f* and the front-side cylinder-head cover 5*f*.

A projected wall 75 is formed by raising upwards the rear-side half of the upper wall 71 of the front-side cylinder-head cover 5*f*. Inside the projected wall 75, a breather chamber 76 is formed.

Meanwhile in the front-side half of the upper wall 71, a right and left pair of downstream-side secondary air valve chambers 80*b*, 80*b* are formed at the center between the right and the left cylindrical positions 72, 72 so as to be adjacent to each other. The inside of a rectangular frame wall 77 of each downstream-side secondary air valve chamber 80*b* projects downwards to form a bottom wall 78.

When viewed from a side (see FIG. 6), the downstream-side secondary air valve chamber 80*b* is located forward of the cylinder axis L, and is located further forward of the rocker-aim shaft 62.

In addition, as shown with two-dot chain line in FIG. 3, the downstream-side secondary air valve chambers 80*b*, 80*b* are located between the right and the left cylinders. To be more specific, the downstream-side secondary air valve chambers 80*b*, 80*b* are located in a space between the right and left rocker arms 63, 63. Such a space is made by the right and the left rocker aims 63, 63 bent respectively in directions such as to make the rocker arms 63, 63 be moved away from each other.

The rear-side corner portion of each bottom wall 78 extends downwards to form an extending portion 78*a*, and a secondary air passage 81*a* is formed in this extending portion 78*a*. The bottom-end surface of the extending portion 78*a* is on the same plane that the bottom-end joint surface of the circumferential wall 70 is on. The bottom-end surface of the extending portion 78*a* is opposed to the upper-end surface of the sticking-up portion 60*c* of the rocker-arm-shaft bearing member 60 attached to the attachment boss portions 56 of the front-side cylinder bead 4*f*. Thus, the secondary air passage 81*a* of the extending portion 78*a* is coaxially connected to the secondary air passage 81*b* of the sticking-up portion 60*c*. To connect these passages 81*a* and 81*b*, a connecting pipe 82 is provided (see FIG. 6).

As a consequence, each downstream-side secondary air valve chamber 80*b* communicates to the exhaust port 12 via the secondary air passages 81*a*, 81*b*, and 81*c*.

Now, refer to FIG. 3. The downstream-side secondary air valve chambers 80*b*, 80*b* are located in the space made by the right and the left rocker arms 63, 63 bent respectively in directions such as to make the rocker arms 63, 63 be moved away from each other. Each secondary air passage 81*b* extending from the corresponding downstream secondary air valve chamber 80*b* is formed as being drawn in the same direction in which the corresponding rocker arm 63 is bent. Accordingly, while the rocker arm 63 is bent and then extends towards the corresponding exhaust valve 31, the secondary air passage 81*b* (81*a*, 81*c*) is formed at a position closer to the exhaust valve 31. As a result, the secondary air passages 81*a*, 81*b*, and 81*c*, which extend to the exhaust port 12, opened and closed by the exhaust valve 31, are made shorter than otherwise.

Each rectangular frame wall 77 forms the corresponding downstream-side secondary air valve chamber 80*b* of the front-side cylinder-head cover 5*f*. Two of the frame walls 77, 77—one on the right side and the other on the left side—are formed so as to be adjacent to each other. Attachment boss portions 77*a*, 77*a* are formed as protruding respectively at the outer sides of the pair of frame walls 77, 77. A common valve cover 85 covers the upper-end openings of the pair of frame walls 77, 77, and has attachment boss portions 85*a*, 85*a*. Bolts 86, 86 penetrate the respective attachment boss portions 85*a*, 85*a* and then are screwed into the respective attachment boss portions 77*a*, 77*a* formed on the side of the frame walls 77, 77. The valve cover 85 is thus fixed to the frame walls 77, 77.

Now, refer to FIG. 6. A rectangular support plate 91 of a secondary-air reed valve 90 is stretched over the upper-end opening of the frame wall 77. The outer periphery of the support plate 91 is clamped by the valve cover 85 and thus is provided across the openings. The space formed over the support plate 91 and tinder the valve cover 85 is an upstream-side secondary air valve chamber 80*a*. The support plate 91 is provided to separate the upstream-side valve chamber 80*a* and the downstream-side secondary air valve chamber 80*b* located under the support plate 91.

The upstream-side secondary air valve chamber 80*a* is separated from the right and left pair of the downstream-side secondary valve chambers 80*b*, 80*b* by the right and the left support plates 91, 91. The upstream-side secondary air valve chamber 80*a* serves as a common space for the downstream-side secondary valve chambers 80*b*, 80*b*.

The secondary-air reed valve 90 includes a reed-valve plate 93 attached to the bottom surface of the support plate 91. The reed-valve plate 93 is thus held between the support plate 91 and a stopper 92 inside the downstream-side valve chamber 80*b*.

A valve hole 91*a* is formed in the support plate 91 and is opened and closed by the reed-valve plate 93.

An inlet connecting pipe 89 is projected from the valve cover 85 to let the secondary air into the upstream-side valve chamber 80*a* from the air cleaner of the intake system of the engine 1.

Incidentally, in the front-side cylinder-head cover 5*f*, the secondary air passage 81*a* has an opening in a coiner of the bottom wall 78 of the downstream-side valve chamber 80*b*, and extends downwards. High-temperature exhaust air blows back through the secondary air passage 81*a*. A heat-shield plate 88 is provided to protect the secondary-air reed valve 90 from direct exposure to the high-temperature exhaust air.

Accordingly, the downstream-side secondary air valve chamber 80*b* located on the downstream side of the secondary-air reed valve 90 is communicated to the exhaust port 12 via the secondary air passages 81*a*, 81*b*, and 81*c*. The secondary-air reed valve 90 is opened and closed in accordance with the exhaust pulsation generated at the exhaust port 12. The secondary air is thus introduced into the exhaust port 12 via the secondary air passages 81*a*, 81*b*, and 81*c*. The secondary air thus introduced is mixed with the exhaust gas that circulates in the exhaust port 12. Unburned constituents of the exhaust gas, such as HC and CO, are oxidized, and the exhaust gas is thus purified.

As has been described above, the rocker-arm shaft 62 is positioned as being offset forwards from the cylinder axis L, and is thus located at a position lower than the cam shaft 51. Such positioning of the rocker-arm shaft 62 allows the rocker arm 63 to be disposed at a position closer to the combustion chamber 10 than otherwise. The secondary air valve chambers 80*a* and 80*b* also disposed at places forward of the cylinder axis L are formed in a space above the rocker arm 63 that is disposed at a lower position. Accordingly, the secondary air chambers 80*a* and 80*b* are disposed at positions lower than otherwise.

As a consequence, the length of the engine 1 in the cylinder axis direction is reduced, and the engine 1 is made more compact in size.

Now, refer to FIG. 2. The rocker arm 63 extends forwards as curving downwards from the rocker-arm shaft 62. This front-side extending portion slants with a position closer to the leading end being located at a lower position. While the rocker arm 63 is located at a lower level in a space that is forward of the rocker-arm shaft 62, the secondary air valve chambers 80*a* and 80*b* are formed in the space. In addition, the secondary air valve chambers 80*a* and 80*b* are formed as slanting downwards to the front along the curved front-side extending portion of the rocker arm 63. Accordingly, the secondary air valve chambers 80*a* and 80*b* are disposed at positions even lower than otherwise. Such positioning makes the engine 1 more compact in size.

The rocker-arm shaft 62 is pivotally supported by the rocker-arm-shaft bearing member 60 that is a member separated from the front-side cylinder head 4*f*. Accordingly, when the engine 1 needs to be made more compact in size, this object can be accomplished with ease by disposing the rocker-arm shaft 62 at a position closer to the combustion chamber 10 than the cam shaft 51 is.

In other words, the rocker-arm-shaft bearing member 60 made as a separate body from the front-side cylinder head 4*f* cause s the following effects. It is no longer necessary to drill a processing hole or the like in the front-side cylinder head 4*f* so as to form a shaft hole for the rocker-arm shaft 62. As a consequence, the engine 1 is made more compact in size, and, concurrently, the man-hour needed for the processing of the front-side cylinder head 4*f*. This leads to an easier assembling operation.

In addition, in the front bank Bf, the distance between the right and the left cylinders is relatively large, and the secondary air valve chambers 80*a* and 80*b* are disposed between these cylinders. As the top view of FIG. 3 shows, the secondary air valve chambers 80*a* and 80*b* are positioned between two of the central rocker arms 63, 63—one at the right-hand side of the secondary air valve chambers 80*a* and 80*b* while the other at the left-hand side thereof—so as not to be overlaid with the rocker arms 63, 63. Accordingly, the secondary air valve chambers 80*a* and 80*b* are placed at even lower positions, and thus the engine 1 is made even more compact in size.

In the rear bank Br, the distance between the right and the left cylinders is smaller than that in the front bank Bf. The valve-lifting structure of the rear bank Br is identical to that of the front bank Bf, though the valve-lifting structures of the respective banks Br and Bf are placed symmetrically to each other.

Component members in the rear bank Br are represented by the same reference numerals that are used for their respective counterparts in the front bank Bf, though a suffix "r" is added to each reference numeral for the members in the rear bank.

Figure 7:
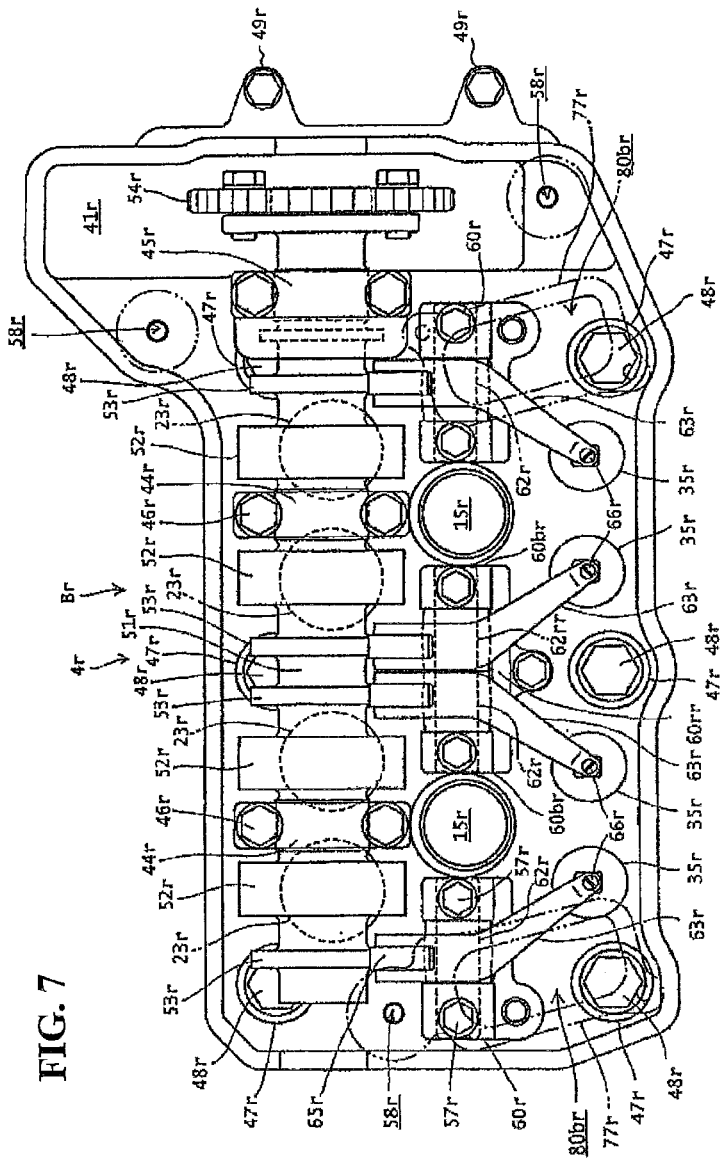
FIG. 7 is a top view of a rear-side cylinder head in a state where a rear-side cylinder-head cover is detached off.

Now, refer to FIG. 7, which is a top view illustrating the internal structure of the rear-side cylinder head 4*r* with a state where the rear-side cylinder-head cover 5*r* is taken off. A cam shaft 51*r* is rotatably supported by bearings (cam-shaft holders 44*r*, 44*r*, and 45*r*) at a front-side half of the rear-side cylinder head 4*r*. A right and a left intake cam lobes 52*r*, 52*r* are formed as protruding respectively at positions adjacent to each cam-shaft holder 44*r*, and a right and a left exhaust cam lobes 53*r*, 53*r* are formed as protruding at the right-outer side and left-outer side of the intake cam lobes 52*r*, 52*r*.

The rotation of the intake cam lobe 52*r*, 52*r* provided on the cam shaft 51*r* directly drives the respective valve-lifters 23*r*, 23*r* of the intake valves 21*r*, 21*r*.

In addition, at the left outer side of the left-hand cam-shaft holder 44*r*, which is the bearing disposed at the outer most side, a set of one of the intake cam lobes 52*r*, 52*r* and one of the exhaust cam lobes 53*r*, 53*r* is supported in a cantilevered state.

For this reason, no bearing is provided on the left-hand end portion of the cam shaft 51*r*. There is no need to raise outwards a portion of the circumferential wall of the rear-side cylinder head 4*r*, which would be necessary when such a bearing was disposed. As a result, the engine is made more compact.

Meanwhile, the right-hand end portion of the cam shaft 51*r* is rotatably supported by the right-hand cam-shaft holder 45*r*, and sticks out inside the chain chamber 41*r*. A driven sprocket 54*r* is attached on the sticking-out portion of the cam shaft 51*r*.

Rocker-arm-shaft bearing members 60r and 60rr, which are bodies formed separately from the rear-side cylinder head 4r, are attached to positions at the right and left sides of each plug insertion hole 15r formed in the rear-side cylinder head 4r. The rocker-arm-shaft bearing members 60r and 60rr are placed at such a low position near a combustion chamber 10r. Note that the two inner-side rocker-arm-shaft bearing members 60, 60 provided in the front bank Bf are replaced by the single rocker-arm-shaft bearing member 60rr in the rear bank Br.

The rocker-arm-shaft bearing member 60rr has a larger distance between a right-hand and a left-hand bearing walls 60br, 60br. Two rocker arms 63r, 63r are pivotally supported so as to swing freely on the rocker-arm shaft 62rr, which is provided between the bearing walls 60br, 60br.

The central axes of the rocker-arm shafts 62r; 62rr are positioned so as to pass near the cylinder axis L, and are offset from the cylinder axis L to the opposite side of the cylinder axis L from the cam shaft 51r.

Accordingly, the rotation of the exhaust cam lobes 53r, 53r on the cam shaft 51r respectively swing the right-hand and the left-hand rocker arms 63r, 63r while the swing of the right-hand and the left-hand rocker arms 63r, 63r respectively drives the right-hand and the left-hand exhaust valves 31r, 31r.

Now, refer to FIG. 7. Fastening boss portions 47r are formed at four positions near and around each of a right and a left cylinder bores of the rear-side cylinder block 3r. The two of all these fastening boss portions 47r, 47r—the front-side and the rear-side ones placed in the center—are used commonly for the cylinder bores, so that six of the fastening boss portions are provided in total.

Figure 8:
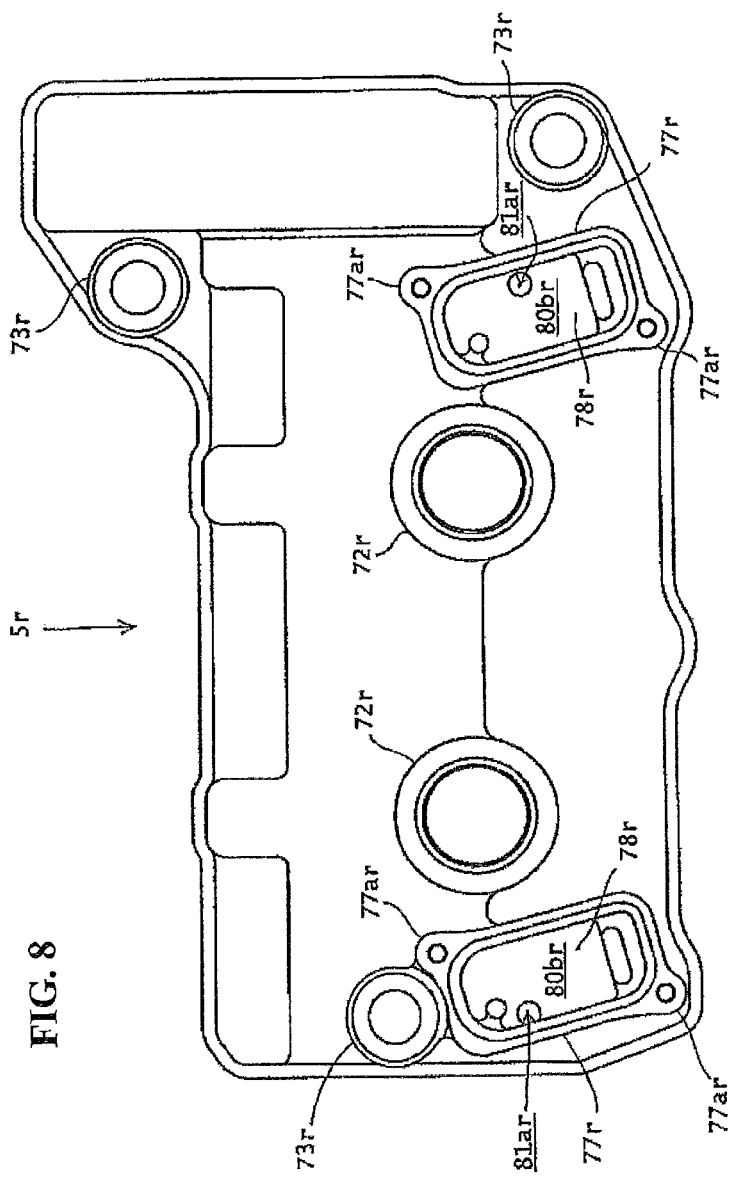
FIG. 8 is a top view of the rear-side cylinder-head cover.

Now, refer to FIG. 8 illustrating a top view of the rear-side cylinder-head cover 5r. What significantly differentiate the rear-side cylinder-head cover 5r from the front-side cylinder-head cover 5f are the downstream-side secondary-air valve chambers 80br, 80br. The downstream-side secondary-air valve chambers 80br, 80br are formed at the rear-side half portion of the rear-side cylinder-head cover 5r and are located separately from each other respectively on the right and the left sides thereof. In addition, the right-hand and the left-band downstream-side secondary-air valve chambers 80br, 80br are formed respectively at the outer sides of the right-hand and the left-hand cylinders.

A frame wall 77r with a longitudinal rectangular shape forms a part of each downstream-side secondary-air valve chamber 80br, and is arranged obliquely with respect to the front-to-rear direction. The right-hand front-side coiner and the left-hand rear-side corner of the frame wall 77r are projected to form attachment boss portions 77ar, 77ar, respectively.

In a bottom wall 78r of each downstream-side valve chamber 80br, a secondary air passage 81ar is formed and is communicated to an exhaust port 12r.

When a valve cover 85 is laid over and attached to each flame wall 77r, the two attachment boss portions 77ar, 77ar located on a diagonal line of the rectangular frame wall 77r help the accomplishment of an efficient fastening. Such an efficient fastening contributes in turn to a reduction in the number of component parts.

In addition, the attachment boss portion 77ar located at the left-hand rear-side corner of the left-hand frame wall 77r is located right above the fastening boss portion 47r at the left-hand rear-side corner of the rear-side cylinder head 4r. Such a location accomplishes an effective use of space. No sideward projection of the rear-side cylinder-head cover 5r is needed at the left-hand rear-side corner thereof. As a result, the engine 1 is made more compact in size.

Moreover, the right-hand frame wall is also obliquely arranged to avoid the interference with the chain chamber 41r. An effective use of space is thus accomplished.

Structural members for vehicle body, such as a fuel tank and an air cleaner, need to be disposed at the rear side of the rear bank Br. Meanwhile, the secondary air valve chambers 80br, 80br are formed separately as a right-hand one and a left-hand one, and are formed respectively at outer sides of the right-hand and the left-hand cylinders. As a result, a larger space to be occupied by the structural members for the vehicle body is secured in the central portion of the rear bank Br.

Other structural features of a valve-lifting system 20r for the rear bank Br are identical to the valve-lifting system 20 for the front bank Bf. It is therefore reasonable to expect that the same effects are obtainable from the structural features mentioned here of the valve-lifting system 20r for the rear bank Br.

It should be noted that the forgoing descriptions of this embodiment is based on a V-type four-cylinder internal combustion engine, but that the invention of the present application is applicable to a linear multiple-cylinder engine. Furthermore, some of the aspects of the invention are applicable even to a single-cylinder engine.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A secondary air supplying system of an internal combustion engine comprising:
   a cylinder head;
   a cam shaft provided in the cylinder head;
   a rocker-arm shaft which is provided in the cylinder head and is parallel with the cam shaft;
   a rocker arm pivotally supported by the rocker-arm shaft;
   a cylinder-head cover for covering the cylinder head from above; and
   a secondary air valve chamber adapted to control the supply of secondary air is formed in the cylinder-head cover in a position separated from the rocker-arm shaft, and includes a rectangular frame wall which projects downwards to form a bottom wall;
   wherein the cam shaft and the rocker-arm shaft are offset from the cylinder axis, and are disposed at respective sides of the cylinder axis from each other, and
   the secondary air valve chamber is formed at a rocker-arm-shaft side of the cylinder axis.

2. The secondary air supplying system of an internal combustion engine according to claim 1, further comprising:
   an intake valve;
   an exhaust valve; and
   a first cam lobe and a second cam lobe provided on the cam shaft, and
   wherein a first one of the intake and the exhaust valves is driven directly by the first cam lobe while a second one of the intake and the exhaust valves is driven by the second cam lobe via the rocker arm.

3. The secondary air supplying system of an internal combustion engine according to claim 1, further comprising:
   a combustion chamber, and
   wherein the rocker-arm shaft is disposed in a position closer to the combustion chamber than where the cam shaft is disposed.

4. The secondary air supplying system of an internal combustion engine according to claim 2, further comprising:
a combustion chamber, and
wherein the rocker-arm shaft is disposed in a position closer to the combustion chamber than where the cam shaft is disposed.

5. The secondary air supplying system of an internal combustion engine according to claim 1, further comprising:
a plurality of cylinders arranged in an axial direction of the cam shaft, and
wherein the secondary air valve chamber is formed between two adjacent ones of the cylinders.

6. The secondary air supplying system of an internal combustion engine according to claim 2, further comprising:
a plurality of cylinders arranged in an axial direction of the cam shaft, and
wherein the secondary air valve chamber is formed between two adjacent ones of the cylinders.

7. The secondary air supplying system of an internal combustion engine according to claim 3, further comprising:
a plurality of cylinders arranged in an axial direction of the cam shaft, and
wherein the secondary air valve chamber is formed between two adjacent ones of the cylinders.

8. The secondary air supplying system of an internal combustion engine according to claim 3, further comprising:
a rocker-arm-shaft bearing member formed as a body separated from the cylinder head, and
wherein the rocker-arm shaft is rotatably supported by the rocker-arm-shaft bearing member.

9. The secondary air supplying system of an internal combustion engine according to claim 1, wherein the secondary air valve chamber is formed at an opposite side of the rocker-arm shaft from the cam shaft.

10. The secondary air supplying system of an internal combustion engine according to claim 1, further comprising:
a plurality of cylinders arranged in an axial direction of the cam shaft, and
wherein the secondary air valve chamber is formed at an outer side of an outer most one of the cylinders.

11. The secondary air supplying system of an internal combustion engine according to claim 1, further comprising:
a secondary air passage extending downwards from an opening in a corner of the bottom wall of the secondary air valve chamber, and
wherein the rocker arm is bent from a pivotally-supporting portion of the rocker-arm shaft to any one of axial directions, and
that the secondary air passage is formed as shifted to a same one of the axial directions to which the rocker arm is bent.

12. A secondary air supplying system of an internal combustion engine comprising:
a cylinder head having a plug insertion hole;
a cam shaft provided in the cylinder head;
a rocker-arm shaft which is provided in the cylinder head and is parallel with the cam shaft;
a rocker arm pivotally supported by the rocker-arm shaft;
a cylinder-head cover for covering the cylinder head from above; and
a secondary air valve chamber adapted to control the supply of secondary air is formed in the cylinder-head cover in a position separated from the rocker-arm shaft;
wherein the cam shaft is offset from a cylinder axis in one of a forward or a rearward direction of the engine, and the secondary air valve chamber, the rocker-arm-shaft, and the plug insertion hole are offset from the cylinder axis in the other of the forward or the rearward direction of the engine.

13. The secondary air supplying system of an internal combustion engine according to claim 12, further comprising:
an intake valve;
an exhaust valve; and
a first cam lobe and a second cam lobe provided on the cam shaft, and
wherein a first one of the intake and the exhaust valves is driven directly by the first cam lobe while a second one of the intake and the exhaust valves is driven by the second cam lobe via the rocker arm.

14. The secondary air supplying system of an internal combustion engine according to claim 12, further comprising:
a combustion chamber, and
wherein the rocker-arm shaft is disposed in a position closer to the combustion chamber than where the cam shaft is disposed.

15. The secondary air supplying system of an internal combustion engine according to claim 13, further comprising:
a combustion chamber, and
wherein the rocker-arm shaft is disposed in a position closer to the combustion chamber than where the cam shaft is disposed.

16. The secondary air supplying system of an internal combustion engine according to claim 12, further comprising:
a plurality of cylinders arranged in an axial direction of the cam shaft, and
wherein the secondary air valve chamber is formed between two adjacent ones of the cylinders.

17. The secondary air supplying system of an internal combustion engine according to claim 15, further comprising:
a rocker-arm-shaft bearing member formed as a body separated from the cylinder head, and
wherein the rocker-arm shaft is rotatably supported by the rocker-arm-shaft bearing member.

18. The secondary air supplying system of an internal combustion engine according to claim 12, wherein the secondary air valve chamber is formed at an opposite side of the rocker-arm shaft from the cam shaft.

19. The secondary air supplying system of an internal combustion engine according to claim 12, further comprising:
a plurality of cylinders arranged in an axial direction of the cam shaft, and
wherein the secondary air valve chamber is formed at an outer side of an outer most one of the cylinders.

20. The secondary air supplying system of an internal combustion engine according to claim 12,
wherein the secondary air valve chamber includes a rectangular frame wall which projects downwards to form a bottom wall,
the secondary air supply system further comprising:
a secondary air passage extending downwards from an opening in a corner of the bottom wall of the secondary air valve chamber, and
wherein the rocker arm is bent from a pivotally-supporting portion of the rocker-arm shaft to any one of axial directions, and that the secondary air passage is formed as shifted to a same one of the axial directions to which the rocker arm is bent.

\* \* \* \* \*